US006584929B2

United States Patent
van der Lely et al.

(10) Patent No.: US 6,584,929 B2
(45) Date of Patent: Jul. 1, 2003

(54) CONSTRUCTION FOR AUTOMATICALLY MILKING ANIMALS

(75) Inventors: Alexander van der Lely, Rotterdam (NL); Karel van den Berg, Bleskensgraaf (NL); Renatus Ignatius Josephus Fransen, Vlaardingen (NL)

(73) Assignee: Lely Research Holding AG (CH)

( * ) Notice: Subject to any disclaimer, the term of this patent is extended or adjusted under 35 U.S.C. 154(b) by 0 days.

(21) Appl. No.: 09/901,067

(22) Filed: Jul. 10, 2001

(65) Prior Publication Data

US 2002/0002953 A1 Jan. 10, 2002

(30) Foreign Application Priority Data

Jul. 10, 2000 (NL) .............................................. 1015670

(51) Int. Cl.[7] .................................................. A01J 3/00
(52) U.S. Cl. .................................. 119/14.01; 119/14.08
(58) Field of Search ............................ 119/14.01, 14.08, 119/14.1, 14.18

(56) References Cited

U.S. PATENT DOCUMENTS

| | | | | | |
|---|---|---|---|---|---|
| 3,789,798 | A | * | 2/1974 | Reisgies et al. | 119/14.08 |
| 3,929,103 | A | * | 12/1975 | Schluckbier | 119/14.08 |
| 5,967,081 | A | * | 10/1999 | Street et al. | 119/14.08 |
| 6,213,051 | B1 | * | 4/2001 | Fransen | 119/14.01 |
| 6,357,387 | B1 | * | 3/2002 | Johannesson | 119/14.1 |
| 6,382,130 | B1 | * | 5/2002 | Rooney | 119/14.01 |

* cited by examiner

Primary Examiner—Charles T. Jordan
Assistant Examiner—Elizabeth Shaw
(74) Attorney, Agent, or Firm—Penrose Lucas Albright

(57) ABSTRACT

An apparatus for the automated milking of animals, such as cows, which comprises a milking compartment and a milking robot associated with the milking compartment. The milking robot is provided with a controllable robot arm that connects and disconnects teat cups to and from the teats of an animal being milked. In one embodiment, the robot arm is suspended from a ball joint so that control of the robot arm is relatively simple, reliable and accurate. In another embodiment the robot arm is suspended from a rail disposed near the top of the milking compartment wherein the rail is pivotably connected to a further rail on top of the milking compartment so that it can be pivoted upwardly and downwardly by a piston and cylinder arrangement. In a third embodiment, the robot arm is suspended from a bearing having a vertical axis in the upper aspect of the milking compartment whereby the robot arm includes two tubes which may be telescoping to provide both horizontal and vertical movements which are used for positioning teat cups under the teats of the animal being milked so that they can be connected or disconnected therefrom and in the latter event moved outside of the milking compartment.

17 Claims, 4 Drawing Sheets

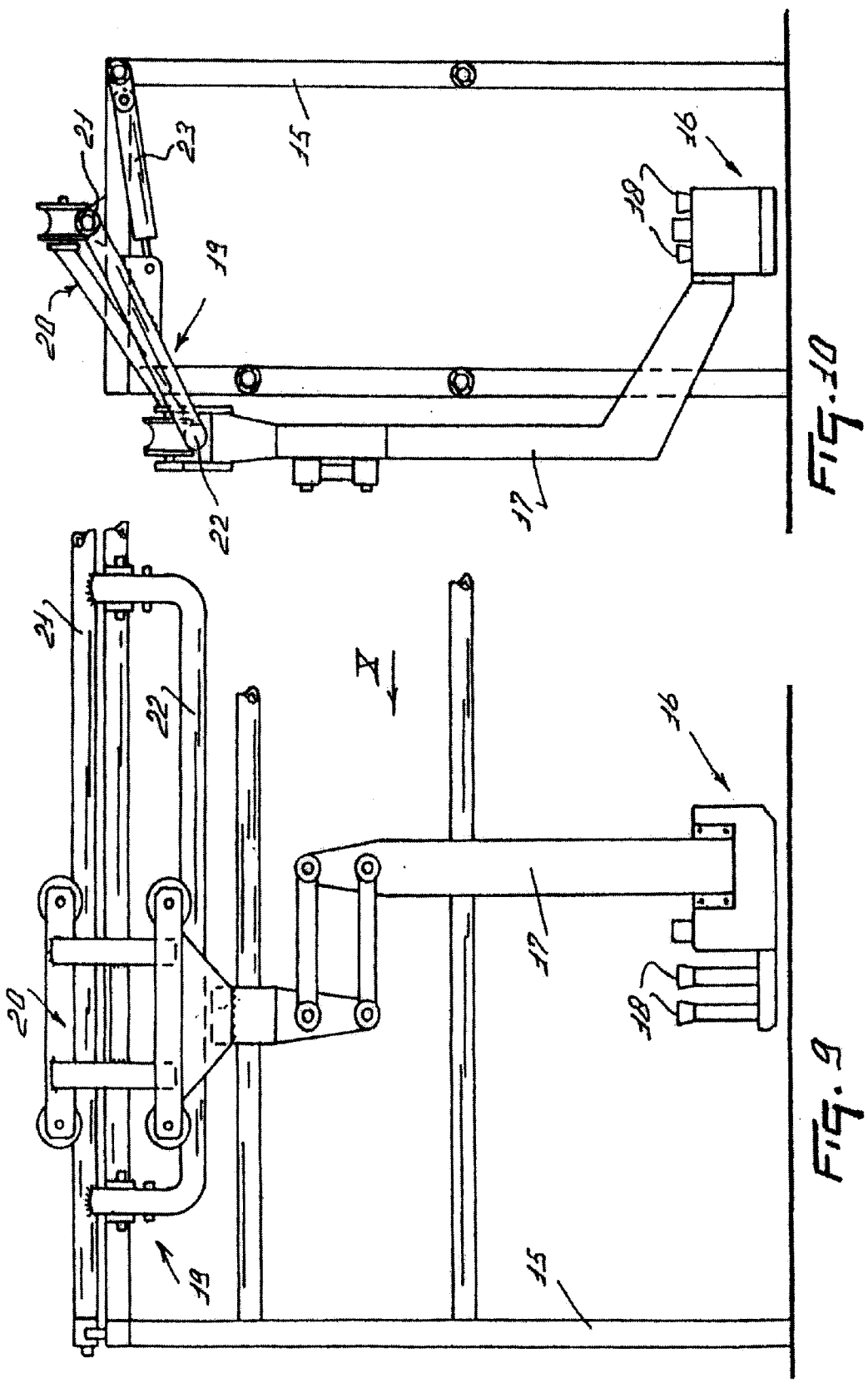

US 6,584,929 B2

CONSTRUCTION FOR AUTOMATICALLY MILKING ANIMALS

FIELD OF THE INVENTION

The invention relates to apparatus for automatically milking animals in a milking compartment wherein a milking robot connects teat cups to the teats of the animal being milked.

BACKGROUND OF THE INVENTION

With known prior art apparatuses, the controllable robot arm is often suspended so that it pivots about an axis. This has the disadvantage, inter alia, that for obtaining the necessary three-dimensional movements a complex control of the robot arm is required.

SUMMARY OF THE INVENTION

An object of the invention is to improve the prior art methodology for the automated attachment of teat cups to the teats of the animal being milked. According to the invention this is achieved by suspending the robot arm from a ball joint. By means of the suspension of the robot arm from the ball joint, its control is relatively simple and yet reliable and accurate.

BRIEF DESCRIPTION OF THE DRAWINGS

The invention will now be explained in further detail with reference to the accompanying figures.

FIG. 9 is a schematic partial side elevational view of a part of a further construction;

FIG. 10 is a schematic front elevational view of a part of the construction according to the arrow X in FIG. 9.

DETAILED DESCRIPTION OF THE PREFERRED EMBODIMENTS

Figure 1:
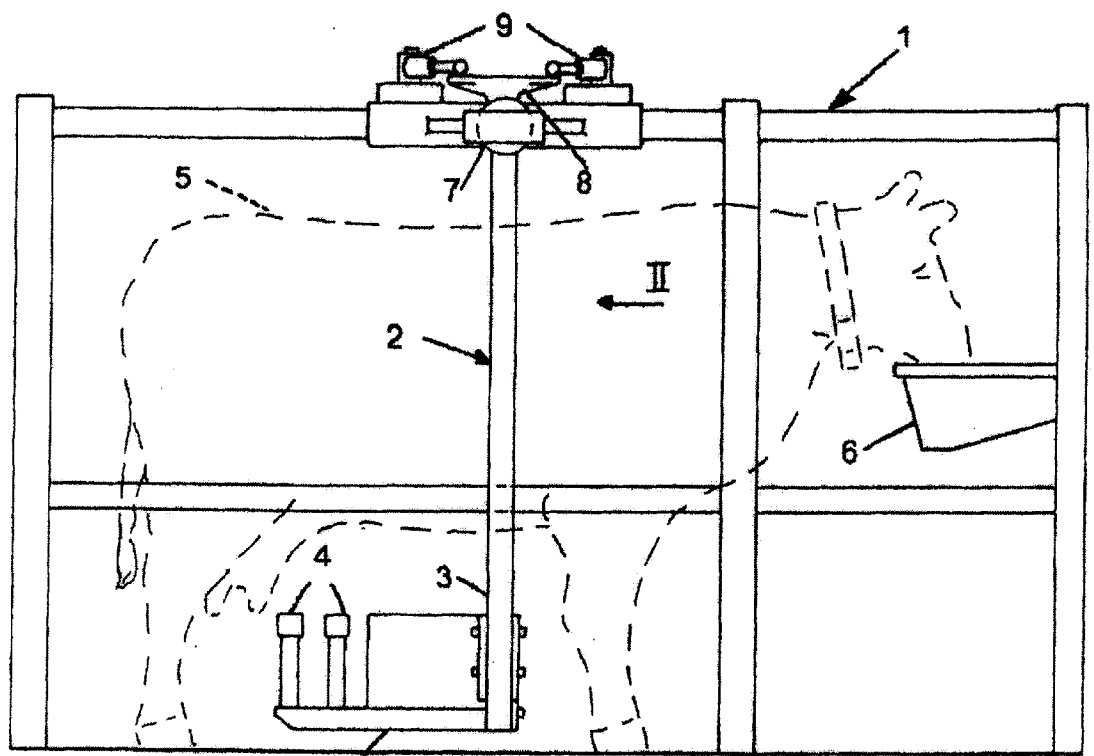
FIG. 1 is a schematic side elevational view of a construction according to the invention.

FIG. 1 is a schematic side elevational view of an apparatus according to the invention for automatically milking animals which comprises a milking compartment 1 with a milking robot 2 that is provided with a controllable robot arm 3 for connecting teat cups 4 to the teats of an animal 5 to be milked (indicated by a dashed line). During automatic milking, animal 5 can eat or drink or both from a feeding trough 6. Robot arm 3 is suspended from a ball joint 7 which is controllable by means of two control elements, comprising piston and cylinder members 9, via an intermediate element 8 connected therewith. The long, substantially vertical part of the robot arm 3 is movable in two directions by means of the two control piston and cylinder members 9.

Figures 2, 3, 4:
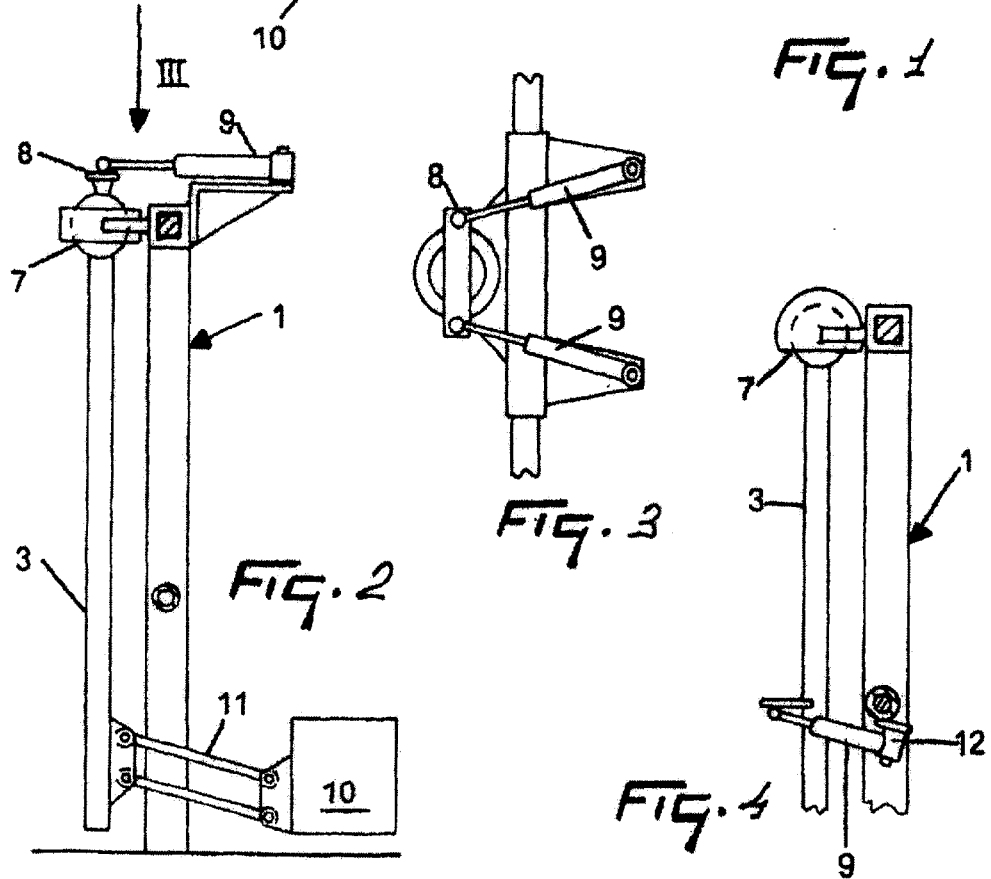
FIG. 2 is a schematic front elevational view of a part of the construction according to the arrow II in FIG. 1.
FIG. 3 is a schematic plan view of a part of the construction according to the arrow III in FIG. 2.
FIG. 4 is a schematic partial front elevational view of a part of the construction in a further embodiment.

As also illustrated in FIGS. 2 and 3, the ball joint 7 is shiftably fastened to the milking compartment 1 (in the embodiment shown it is moveable in horizontal directions). A further part of robot arm 3 is provided with a carrier element 10 for the teat cups 4. With the aid of further control means, said carrier element 10 is movable substantially in vertical direction relative to the straight part of robot arm 3 that is connected with the ball joint 7. In the embodiment shown in FIGS. 1 to 3, the further control means comprise a parallelogram construction 11. Of course, the further control means may also be designed differently, such as a telescopic construction, a piston and cylinder construction or a hingeable construction.

In the embodiment of FIG. 4, ball joint 7 is again shiftably fastened to milking compartment 1. Robot arm 3 is now connected with an intermediate element 12 which is itself connected with the two control piston and cylinder units 9. Piston and cylinder units 9 are also shiftably fastened to the milking compartment 1. Robot arm 3 can in principle be moved in the same manner as illustrated in FIGS. 1–3.

Figure 5:
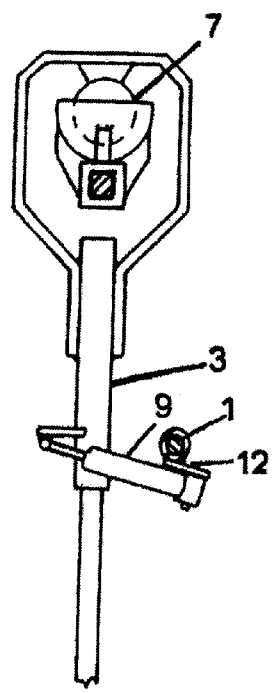
FIG. 5 is a schematic partial front elevational view of a part of the construction in a still further embodiment.

In the embodiment of FIG. 5, ball joint 7 is again shiftably fastened to milking compartment 1. Robot arm 3 is now vertically movable by means of a telescopic construction and again connected with an intermediate element 12 which is itself connected with the two control piston and cylinder members 9. The piston and cylinder members 9 are also shiftably fastened to milking compartment 1. Robot arm 3 can in principle again be moved in the same manner as indicated in the previous FIGS. 1–4.

Figure 6:
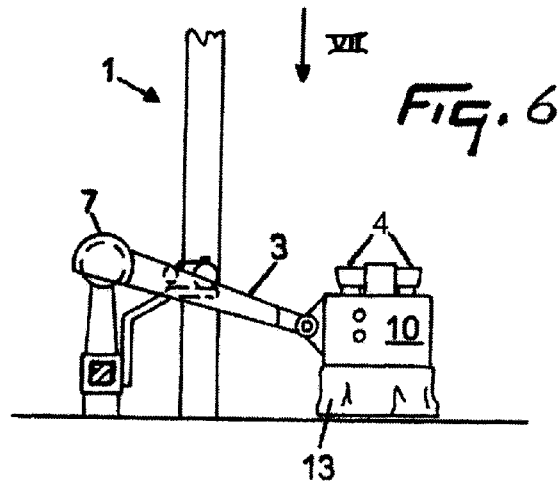
FIG. 6 is a schematic partial front elevational view of a part of the construction in another further embodiment.
Figure 7:
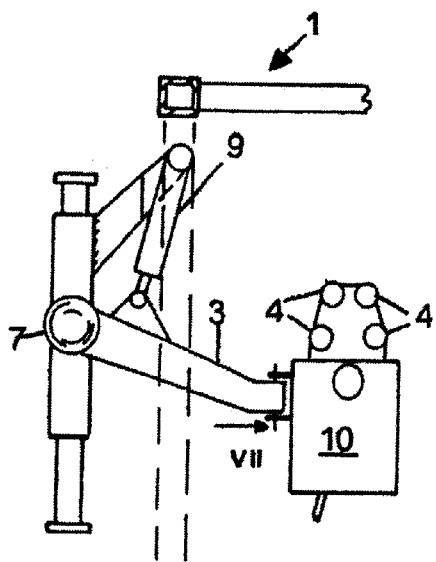
FIG. 7 is a schematic partial plan view of a part of the construction according to the arrow VII in FIG. 6.
Figure 8:
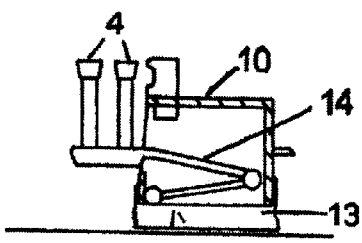
FIG. 8 is a schematic side elevational cross-sectional view of a part of the construction according to the arrow VIII in FIG. 7.

In the embodiment of FIGS. 6 to 8, ball joint 7 is fastened at a rather low level at the lateral side just outside milking compartment 1. Ball joint 7 is again shiftable in the longitudinal direction of milking compartment 1. Carrier element 10 with teat cups 4 is provided with an air cushion construction 13 and is thus suitable for being moved in a floating manner over the floor of milking compartment 1. With the aid of piston and cylinder member 9, robot arm 3 can be pivoted to under the udder of animal 5 to be milked and again be pivoted away therefrom. As shown in FIG. 8, carrier element 10 is further provided with a rod construction 14 with controllable hinges by means of which the teat cups 4 can be moved in vertical direction. Said robot arm construction is very compact.

FIGS. 9 and 10 show schematically a part of a further apparatus (without a ball joint) for automatically milking animals. This apparatus is provided with a milking compartment 15 with a milking robot 16, which is provided with a controllable robot arm 17 for connecting teat cups 18 to the teats of an animal to be milked. Robot arm 17 is suspended from a suspension element 20 that is movable along a rail construction 19 which extends preferably in the longitudinal direction of milking compartment 15. Rail construction 19 is partially pivotably connected to milking compartment 15 and comprises a first tubular rail 21, which is fixedly connected to milking compartment 15, and a second tubular rail 22 extending parallel to first rail 21, said second tubular rail 22 being pivotable by means of a piston and cylinder control element 23 that is connected to milking compartment 15 (see FIG. 10).

The arrangement is suitable for moving teat cups 18 to under the animal to be milked or away therefrom by means of the pivoting movement of rail construction 19. By means of structure such as a parallelogram construction, teat cups 18 can be moved in vertical direction. Pivotable rail construction 19 with the double suspension element 20, bearing on two tubular rails 21 and 22, is very robust.

Figure 11:
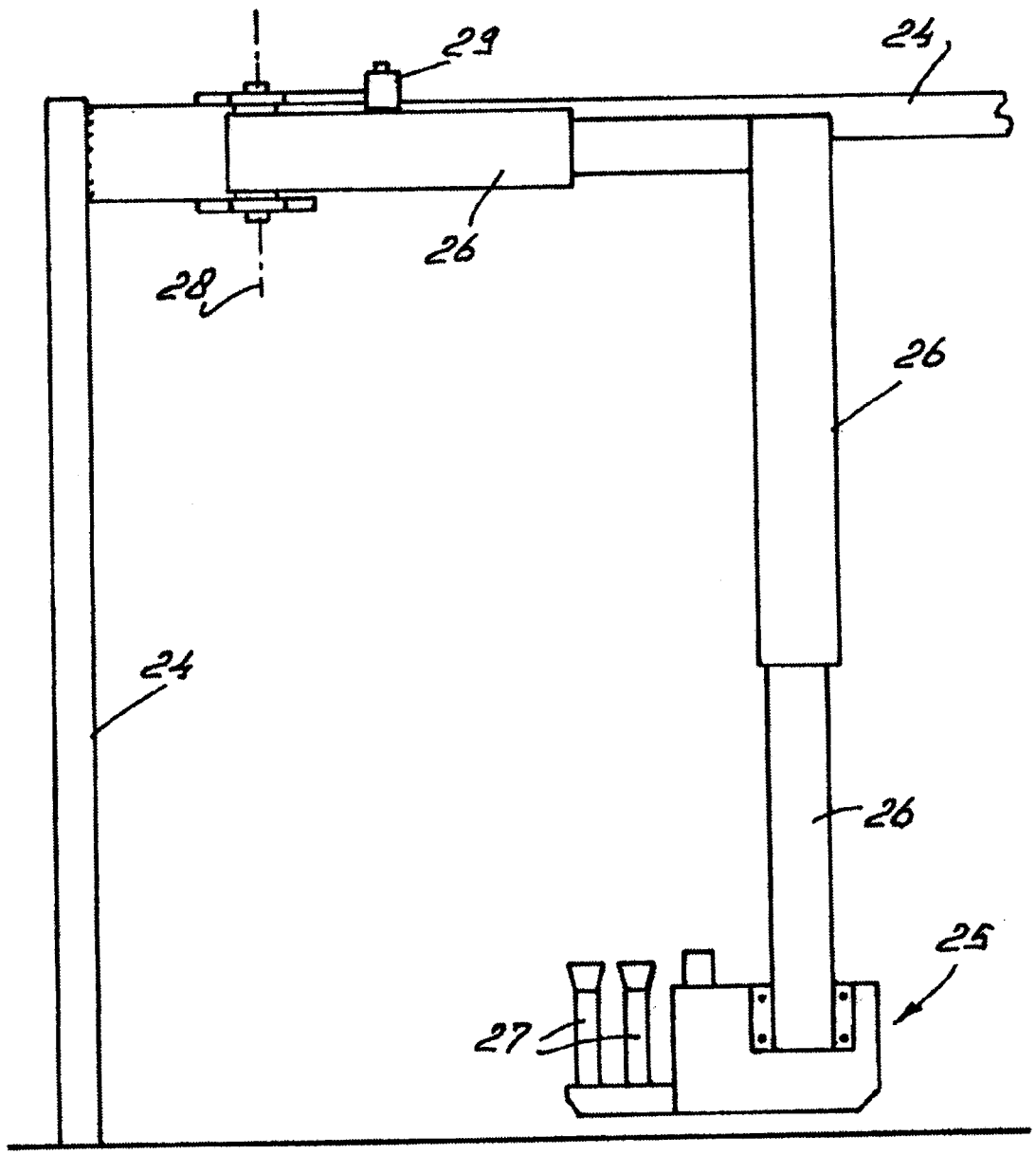
FIG. 11 is a schematic partial side elevational view of a part of a further construction.

FIG. 1 is a schematic view of a part of a further construction (without a ball joint) for automatically milking animals. The construction is provided with a milking compartment 24 with a milking robot 25, which is provided with a controllable robot arm 26 for connecting teat cups 27 to the teats of an animal to be milked. Robot arm 26 is rotatably suspended about a substantially vertical axis 28 and is suitable for moving teat cups 27 to under the animal to be milked or away therefrom by means of its rotation about the substantially vertical axis. For that purpose the lower part of robot arm 26 is provided with a portion which extends substantially horizontally, perpendicularly to the longitudinal direction of milking compartment 24 (i.e. perpendicularly to the plane of drawing of FIG. 11) and which can be extended to under the udder of the animal to be milked.

The rotation takes place by means of a control cylinder 29. Teat cups 27 can be moved in the longitudinal direction of milking compartment 24 with, for example, a telescopic construction and in vertical direction with the aid of a further telescopic construction or, for example, a parallelogram construction. Said robot arm construction is compact and occupies relatively little space during the pivoting movement.

Although we have disclosed the preferred embodiments of our invention, it is to be understood that it is capable of other modifications and adaptations within the scope of the following claims.

What is claimed is:

1. A construction for automatically milking animals, said construction comprising a milk box (1) with a milking robot (2), which is provided with a controllable robot arm (3) for connecting teat cups (4) to the teats of an animal (5) to be milked, characterized in that the robot arm (3) is suspended from a ball joint (7).

2. A construction in accordance with claim 1 further comprising at least one control element, said robot arm being controllable by said control element.

3. A construction in accordance with claim 2, wherein said control element comprises two piston and cylinder units which are connected to move said robot arm substantially in two directions.

4. A construction in accordance with claim 1, which further comprising at least one control element, said ball joint being connected therewith and controllable by means of said control element.

5. A construction in accordance with claim 4, wherein said control element comprises two piston and cylinder elements, said ball joint being movable substantially in two directions by said two piston and cylinder units.

6. A construction in accordance with claim 1, wherein said ball joint is shiftably fastened to said milk box.

7. A construction in accordance with claim 1, comprising intermediate means which connects said robot arm to said ball joint, said robot arm being provided with a carrier element which supports said teat cups, and further control means for moving said carrier element substantially in one direction relative to said intermediate means.

8. A construction in accordance with claim 7, wherein said further control means comprises a parallelogram structure.

9. A construction in accordance with claim 7, wherein said further control means comprises a telescoping structure.

10. A construction in accordance with claim 7, wherein said further control means comprises a piston and cylinder structure.

11. A construction in accordance with claim 7, wherein said further control means comprises a hingeable structure.

12. A construction in accordance with claim 7, wherein said carrier element is provided with an air cushion means for being moved in a floating manner over the floor of said milk box.

13. An apparatus for automatically milking animals which comprises a milking compartment, a milking robot including a controllable robot arm, teat cups for being automatically connected to the teats of an animal to be milked by said controllable robot arm, pivotable means comprising two parallel pivotable rail constructions, one said rail construction being in part pivotably connected with said milking compartment, said robot arm being suspended from a suspension element which is movable along and pivotably relative to said other rail construction.

14. An apparatus in accordance with claim 13, wherein said one rail construction is, in part, fixedly fastened to said milking compartment and said other rail construction extends parallel to said one rail construction, said other rail construction being pivotable by means of a control element that is connected with said milking compartment.

15. An apparatus in accordance with claim 13, wherein said teat cups together with said robot arm are movable to and from under the animal to be milked in said milking compartment by means of pivoting movement of said pivotable means.

16. An apparatus for automatically milking animals which comprises a milking compartment, a milking robot which is provided with a controllable robot arm, teat cups carried by said robot arm to be connected to the teats of an animal to be milked in said milking compartment, said robot arm being rotatably suspended to rotate about a substantially vertical axis which is located at least substantially as high as the adjacent height of an animal being milked in said milking compartment.

17. An apparatus in accordance with claim 16, wherein said robot arm is adapted to move said teat cups to and from under the animal being milked in said milking compartment by means of rotational movement about said substantially vertical axis.

* * * * *